Sept. 13, 1966    J. H. LEMELSON    3,272,347
ARTICLE MANIPULATION APPARATUS
Filed Jan. 14, 1963    6 Sheets-Sheet 1
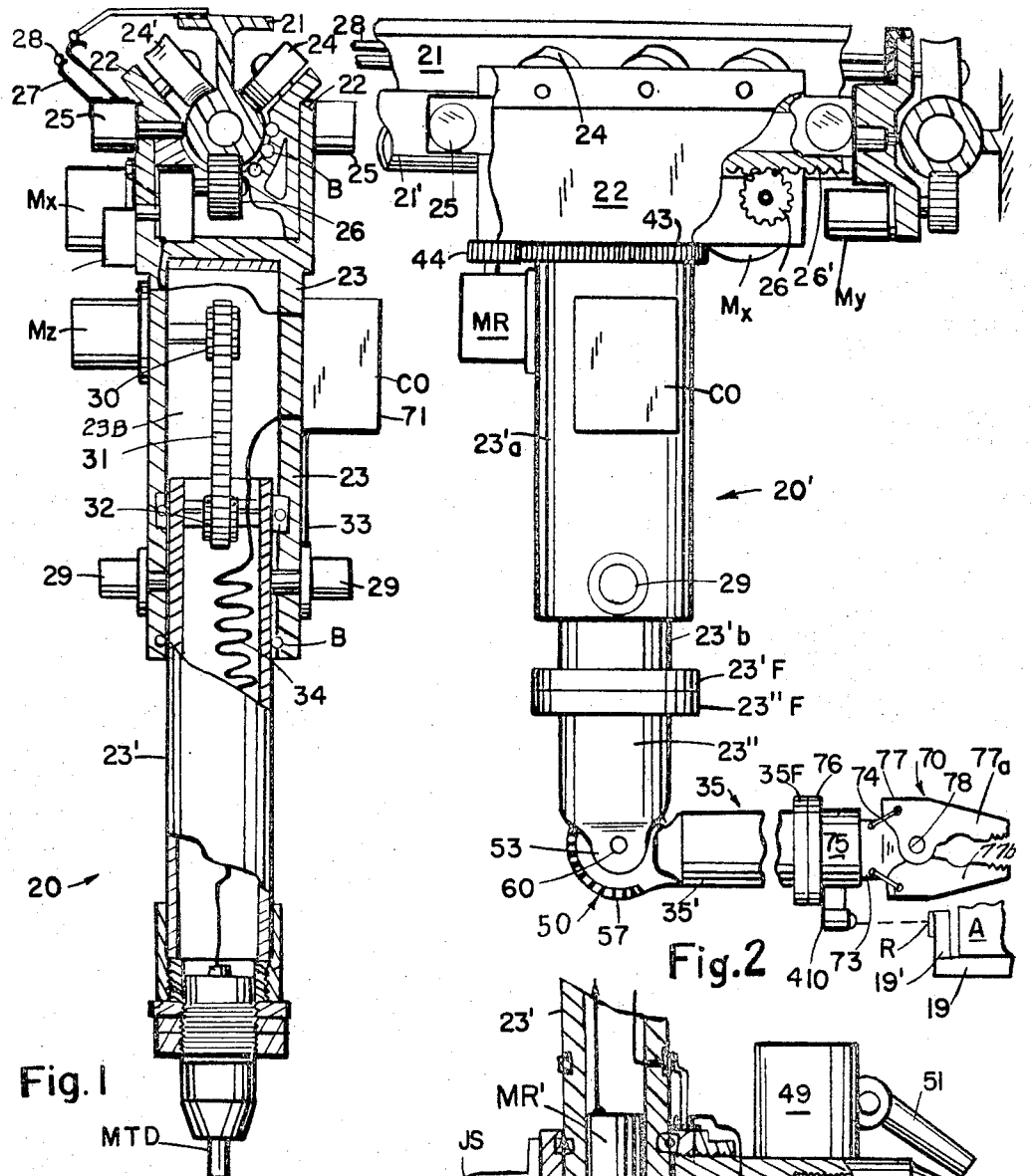
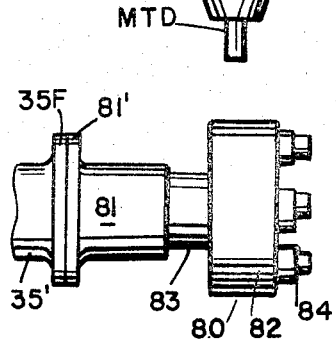
Fig. 3
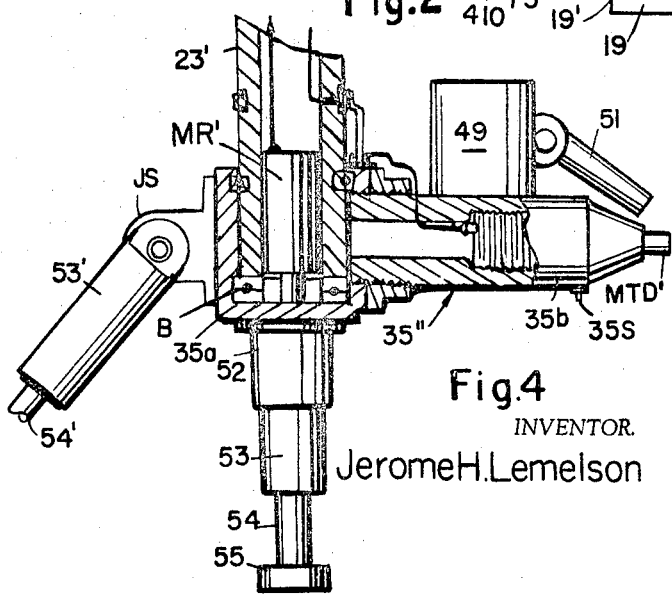
INVENTOR.
Jerome H. Lemelson Sept. 13, 1966  J. H. LEMELSON  3,272,347
ARTICLE MANIPULATION APPARATUS
Filed Jan. 14, 1963  6 Sheets-Sheet 2

INVENTOR.
Jerome H. Lemelson

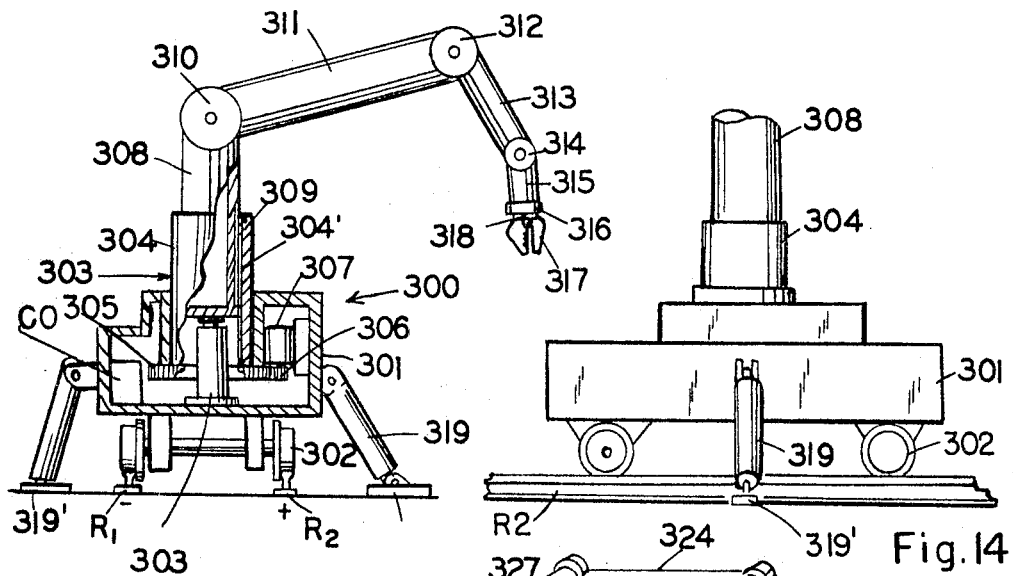
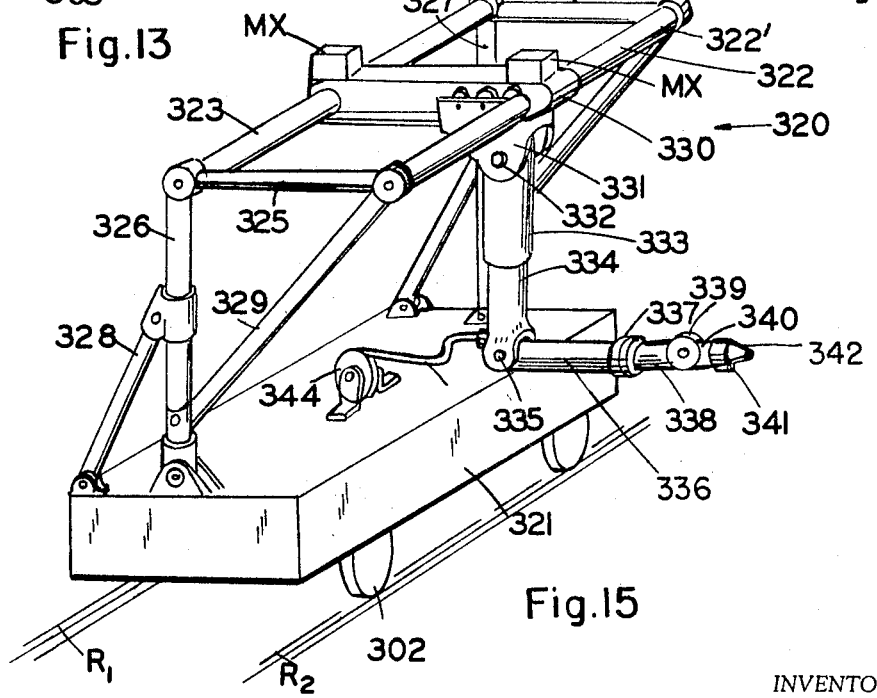

United States Patent Office 3,272,347
Patented Sept. 13, 1966

3,272,347
ARTICLE MANIPULATION APPARATUS
Jerome H. Lemelson, 85 Rector St., Metuchen, N.J.
Filed Jan. 14, 1963, Ser. No. 251,410
9 Claims. (Cl. 214—1)

This invention relates to an automatically controlled manipulator and is a continuation-in-part of my copending application entitled, Automation Devices, Ser. No. 477,467, which was filed December 24, 1954, now abandoned.

In the performance of many production and maintenance operations, manual labor is frequently required to pre-position a tool, device, or probe relative to a work piece and to manipulate it thereafter in order to perform a given function. Not only is the cost of such labor substantially high but other factors such as quality and production rate are limited by and dependent on the skill of the operator. Frequently, it is impossible for one or more operators to handle a particular tool and specialized equipment must be designed, developed and constructed for the performance of certain routine functions. This equipment is quite often not flexible and is used to perform one or a few operations.

This invention is primarily concerned with manipulating devices for the performance of a plurality of manufacturing functions, which devices may be automatically or semi-automatically controlled to perform various movements in a given volume.

Another object is to provide an automatically controlled manipulator the motions of which may be controlled by a programming means, the program or sequential control of which is easily changed or varied.

Another object is to provide an improved, automatically controlled manipulator having components which are easily interchanged.

Another object is to provide an improved automatic manipulator and an improved joint therefor, a portion of which may be easily disassembled and interchanged with other joint portions.

Still another object is to provide an improved automatic manipulator including a power operated carriage therefor, which carriage may be automatically controlled to pre-position the manipulator at a given floor or spatial location in a large production area.

Another object is to provide an automatic manipulator having an automatic controller or computing mechanism mounted directly thereon whereby the need for remote control thereof is eliminated.

Another object is to provide an automatic manipulator and a conveyor therefor for prepositioning said manipulator at a given spatial location in a production area and an automatically controlled means for fixing or locking a portion of the manipulator at an attained position while other portions thereof perform a given function whereby an operating base may be established for the tool of the manipulator and substantial precision in the control thereof may be effected.

Another object is to provide an automatic manipulator for performing functions which require the feeding of a material, which manipulator includes means mounted thereon for retaining a supply of said material and feeding it to a tool of the manipulator.

Other objects and additional features of the invention will be obvious from the accompanying drawings and the following specification.

In the drawings:

FIG. 1 is an end view with parts broken away for clarity of an automatic tool manipulation apparatus which is movable along an overhead trackway;

Figure 2:
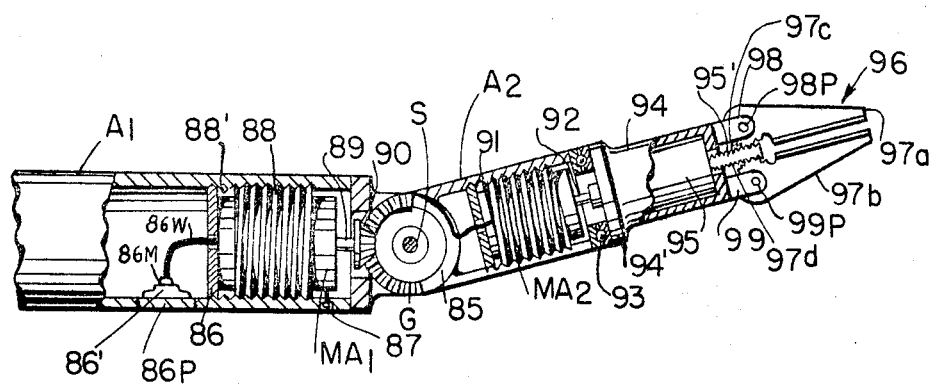
FIG. 2 is a side view with parts broken away for clarity of an article manipulation apparatus having many of the features of the apparatus of FIG. 1.
Figures 5, 6:
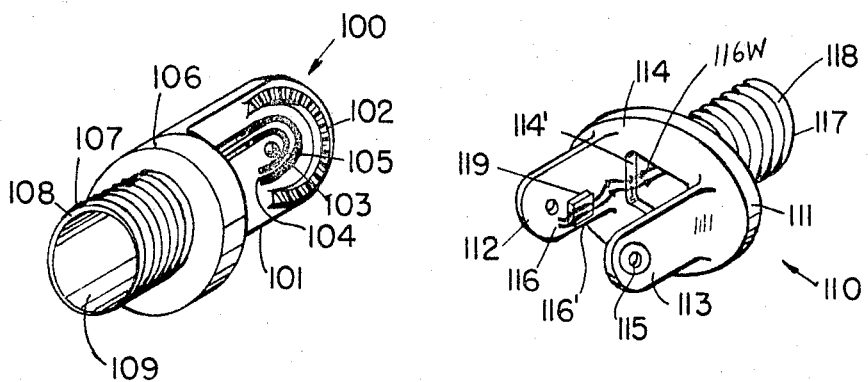
Figure 7:
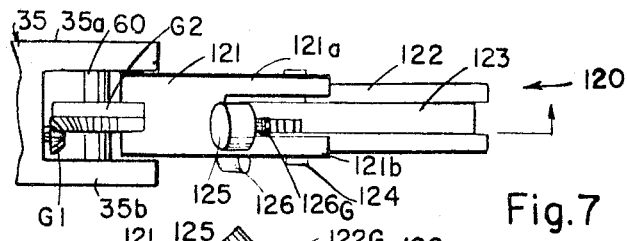
Figure 8:
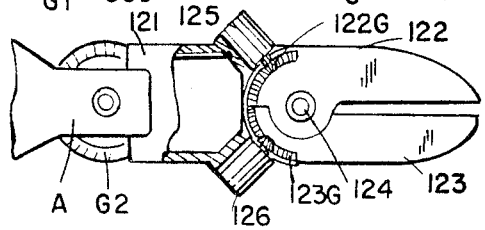
Figure 9:
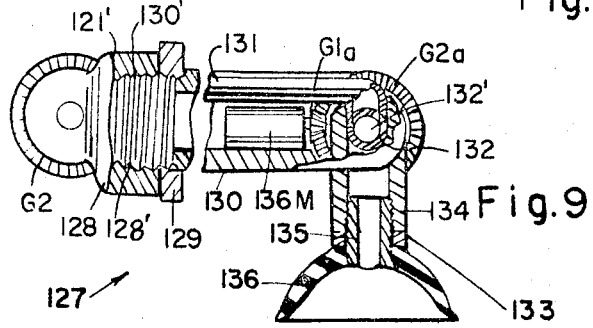
Figure 10:
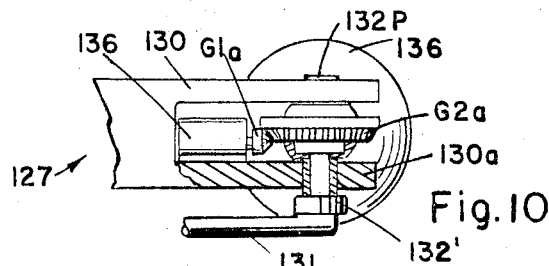
Figure 11:
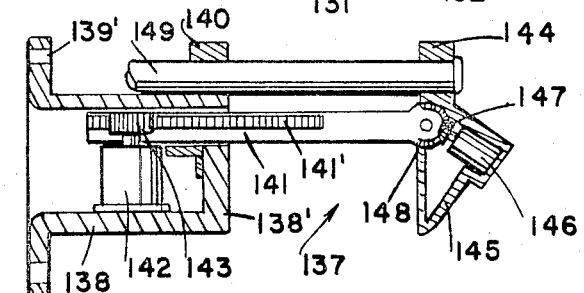
Figure 12:
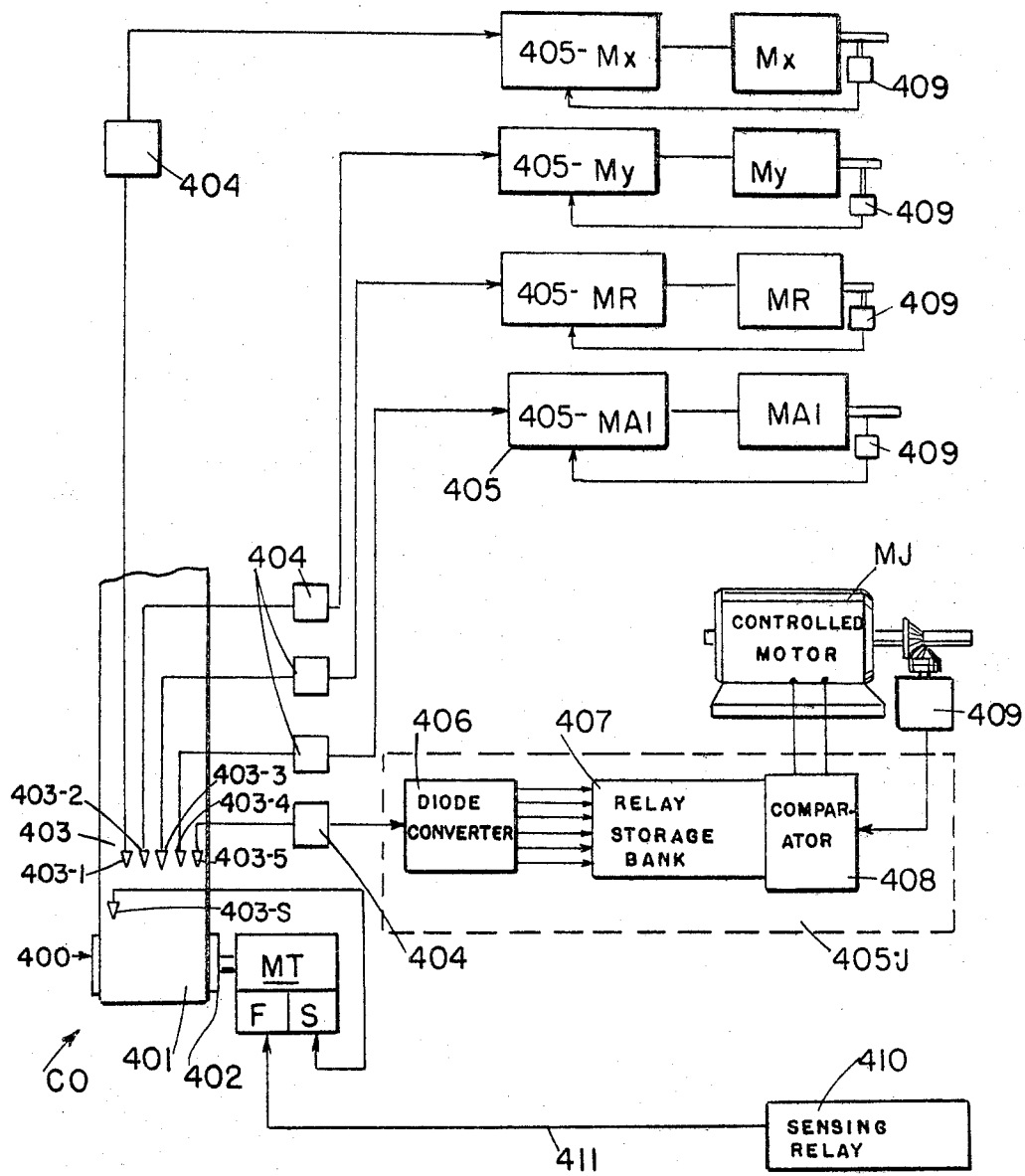

FIG. 2' is a side view with parts broken away for clarity of a manipulator arm assembly applicable to the apparatus of FIG. 2;

FIG. 3 is a partial view of a tool or article manipulation apparatus applicable to apparatus such as that illustrated in FIG. 2;

FIG. 4 is a partial view of a tool or article manipulation apparatus applicable to the apparatus of FIGS. 1 and 2 and showing means for stabilizing and supporting the apparatus above a floor;

FIG. 5 is an isometric view of a joint component;

FIG. 6 is an isometric view of a yoke shaped joint member adapted for assembly with the member illustrated in FIG. 5;

FIG. 7 is a top view of a jaw assembly for seizing and releasing articles and applicable to the apparatus of FIGS. 1–4;

FIG. 8 is a side view of the jaw assembly of FIG. 7 with parts broken away for clarity;

FIG. 9 is a side view with parts broken away for clarity of an automatic manipulator joint and suction retaining means at the end thereof;

FIG. 10 is a partial top view of the apparatus of FIG. 9 with parts broken away for clarity;

FIG. 11 is a side view with parts broken away for clarity of a manipulator clamping fixture applicable to the apparatus of FIG. 1;

FIG. 12 is a schematic diagram of a programable automatic control means for automatically operating apparatus of this invention or the like;

FIG. 13 is an end view with parts broken away for clarity of an automatic manipulation apparatus mounted on a wheeled vehicle;

FIG. 14 is a partial view of the apparatus of FIG. 13 and

FIG. 15 is an isometric view of a further type of vehicle mounted automatic manipulation apparatus.

Figure 16:
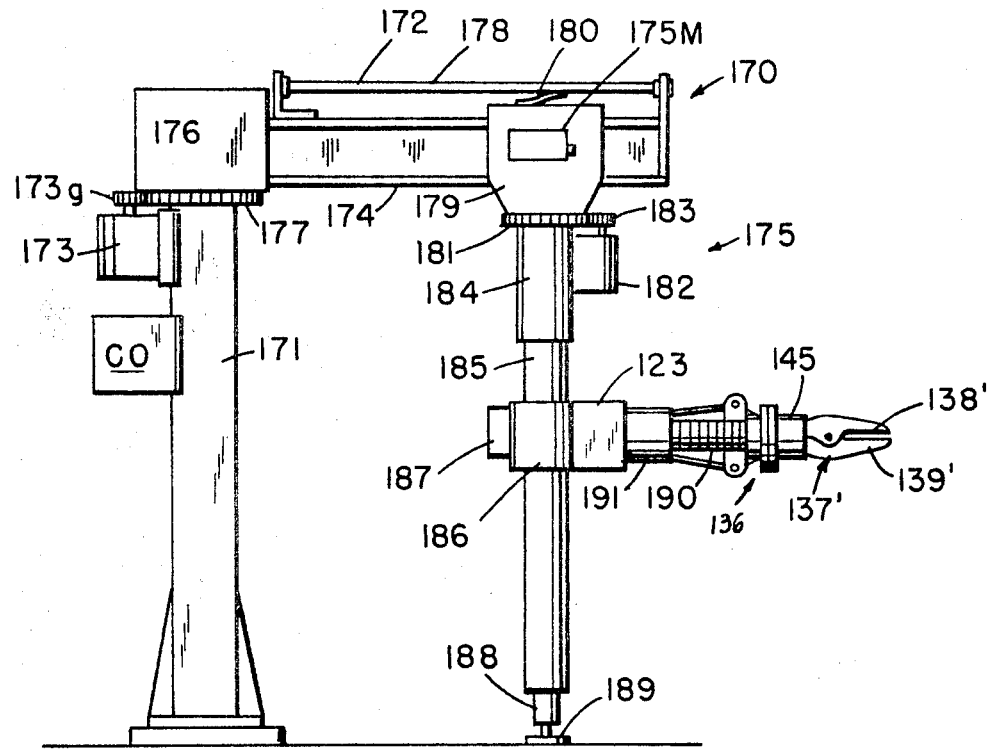

FIG. 16 is a side view of still another form of floor mounted apparatus incorporating the novel concepts of the instant invention.

FIGS. 1 and 2 illustrate details of an automatic article manipulation apparatus or tool, certain portions of which form part of this invention and are illustrated in the other drawings. Part of a typical automatic production apparatus 20 is shown in FIG. 1 and application of certain of the features of the apparatus of FIG. 1 to an automatic article manipulator apparatus 20' is shown in FIG. 2.

The apparatus comprises an overhead support or trackway 21 along which a tool denoted MTD in FIG. 1 or manipulator may be conveyed and prepositioned by means of a carriage 22 and a plurality of movable linkages or arms. In FIG. 1 a first arm or column 23 is integrally secured to the overhead carriage 22 and supports a plurality of components including a second arm 23' which is a tubular cylinder adapted for vertical movement through the bore 23B of the column 23. A plurality of wheels 24, 24' are supported in bearing by formations 22' defining sidewall portions of the carriage 22 and ride along the lower cylindrical portion 21' of the overhead track 21 for movement of the carriage assembly therealong. A reversible electrical gear motor Mx is secured to the sidewall of the carriage 22 and has its output shaft driving a toothed wheel 26 which engages a toothed track 26' cut in the lower surface of the portion 21' of overhead track 21. Thus by controlling the operation of motor Mx the position of the carriage 22 and its manipulator or tool assembly may be predetermined along track 21 for performing predetermined operations on work-in-process which is prepositioned or which follows a predetermined path relative to the overhead track. Electrical power for the servo motors associated with the assembly 20 or 20' is derived from overhead wires 28 which are insulatedly supported off the overhead track and are swept by respective electrical brushes or sliding elements 27 which are insulatedly supported off the carriage 22 and extend to respective of the servo motors to be controlled or to a positional computing mechanism CO located in a housing 71 which is shown mounted along the side wall of the column 23. Thus signals transmitted along the overhead wires may be utilized to preset or otherwise control the positional computer CO as well as to supply electrical energy for the operation of said computer and the servo motors to be described. Notation B refers to steel balls mounted within receptacles in the wall of the carriage 22 to provide rolling engagement with the cylindrical portion 21' of the overhead track to simplify the movement of 22 therealong. Notation 25 refers to lineal actuators or servos mounted against the side walls of the overhead carriage 22 which, when activated, are adapted to project their respective actuating arms to engage the wall of the track and to lock the carriage in position.

A reversible gear motor Mz is shown secured to the side wall of column 23 and has a pulley or sprocket wheel 30 secured to its output shaft. A drive belt or chain 31 loops over the sprocket 30 and around a second pulley or sprocket 32 which is supported for rotation within the upper end of the column 23'. The drive chain 31 is thus operative to raise and lower column 23' within column 23 depending on the direction of rotation of the output shaft of motor Mz. Lineal actuators or solenoids 29 mounted on the side wall of 23 are utilized to engage the surface of the column 23' and to lock it in place when 23' is in a predetermined vertical position. Notation 33 refers to the wire connecting the locking actuators 29 with the positional computer CO which computer controls not only the position in which 23' is stopped and locked but also the degree of operation of the other servos including the locking actuators 25, Mx, Mz and those to be described.

Whereas in FIG. 1 column 23 is fixed relative to the overhead carriage 22, in FIG. 2 the column 23'a is rotationally supported by the overhead carriage. A large spur gear 43 is shown secured to the bottom wall of carriage 22 and the column 23'a is supported on a vertical shaft and bearing (not shown). A reversible gear motor MR is secured to the wall of column 23'a near the upper end thereof and has a small spur gear 44 secured to its output shaft and engaging the teeth of gear 43. Thus as motor MR operates, the column 23'a and the assembly therebelow will rotate in a direction depending on the direction of rotation of the output shaft of MR.

In FIG. 2 a second cylindrical column 23'b is longitudinally movable within the bore of column 23'a and has a flange 23'F secured to the end thereof. A third column 23" having an upper flange 23"F is secured to the column 23'b by retaining the two flanges together with fasteners. Thus various assemblies, arms and fixtures may be secured to the end of column 23'b depending on the operation to be performed by the apparatus 20'.

The other end of column 23" is provided with a yoke formation 53, shown in detail in FIGS. 5 and 6, which supports a pin or shaft 60 on which is rotationally supported a gear plate 57 which is secured to a further arm assembly including jaw means 77 at the end thereof for seizing and releasing an article. Notation 50 refers to the entire joint assembly, which will be described and 35 to the manipulator assembly depending outward from said joint assembly. Assembly 35 comprises a first arm 35' of cylindrical tubular shape, a flange 35f at the end thereof, a second arm 75 having a flange 76 and rotationally supported at the end of 35' by means illustrated in FIG. 3 and forming a part of the assembly 70 which includes the jaws 77a and 77b. The jaws 77a and 77b are pivotally mounted on pin 78 supported at the end of a base 73 secured to arm 75 and are operated by respective or a single servo through linkages 74 as illustrated in application Ser. No. 477,467.

The apparatus illustrated in FIGS. 1 and 2 is subject to a substantial degree of variation. By providing simple assembly and disassembly means for the joints defined between components 23, 23'; 23'a, 43; 23", 23'b; 35', 23"; 75, 35' and the jaw assembly base 73 and 75, it is easily seen that devices and assemblies of the various configurations may be fabricated by varying the shape, length and configurations of said arms and the type of tool or article seizing means secured to the assembly.

It is also noted that the overhead track travelling manipulators 20 and 20' may be mounted on floor travelling vehicles or trucks to further increase their versatility or that the overhead mounted carriage itself may be replaced by a floor mounted base or a vehicle adapted to travel along a guideway or tracks mounted on the floor. Many structural variations are possible in which the single arm assembly, such as that shown supported and downwardly extending from arms 23' or 23'b, may be replaced by a plurality of arms mounted on a frame or other assembly as hereinafter described or illustrated in my said copending application.

Also illustrated in FIG. 2 is means 19 for prepositioning one or a plurality of articles or assemblies A relative to the overhead track 21 and the automatic conveying apparatus 20' so that by referencing and automatically programming the manipulator, it may be controlled to open the jaws of the assembly 70, preposition said jaws adjacent a predetermined portion of the article A, clampingly engage opposite surfaces of the article by predetermined closure of said jaws, lift the article off the prepositioning means 19, retain and move the article through a predetermined spatial path, further preposition the article and/or release said article after work has been performed thereon. The prepositioning means 19 may compirse a gravity or power operated conveyor or any suitable means for aligning and locating the article relative to the manipulator. A sensing relay 410 mounted at the end of the manipulator arm 75 may be used to sense the presence of the article and energize the automatic controller CO or articles may be fed automatically to the end of 19 against a stop 19' which prepositions each article.

Notation R refers to a reflective marker disposed at the end of the chute 19 or on the article A and adapted for energizing the photoelectric cell in sensor 410.

FIG. 2' shows structural and component details of a manipulator arm assembly of the type illustrated in FIG. 2 in which a modified article handling device is provided. The assembly comprises a first arm A1 which may be similar in position and structure to either the arm member 35' of FIG. 2 or 23' of FIGS. 1 or 2. The end of A1 is provided with a pair of yoke members (not shown) but illustrated in FIG. 2 for supporting a shaft S in a bearing which shaft retains the end of a second arm A2. The end of arm A2 is defined by a disc-like plate 85 having a semi-circular formation of tapered gear teeth G the axis of which formation is the axis of the shaft S. The end of arm A1 is provided with interior threading 88' and a reversible servo motor MA1 having a housing with exterior threads 88 cut therein, which is screwed into the threaded bore of A1 until the end of the motor engages a plate 86 extending across the bore in A1. A set-screw 87 passes through a threaded opening in the wall of A1 and engages an unthreaded portion of the housing of motor MA1 to prevent its rotation. The shaft 89 of motor MA1 has a bevel gear 90 secured thereto which engages the teeth in the gear G cut in the end plate formation 85. The motor MA1 is preferably a gear motor of sufficient power to rotate the assembly coupled to the shaft thereof when retaining an article of a certain maximum weight on the seizing head 96 provided at the end thereof. Notation 86' refers to a disconnectible coupling member secured to a gate or door 86P which forms part of the wall of member A1 and is removable to permit electrical coupling of the motor MA1 to wires extending along arm A1 should it be required to remove said motor for repair or maintenance purposes. Wires 86W extend from the motor through an opening in plate 86 and have a male plug 86M secured thereto for electrically connecting said wires to the connector 86P. Removably secured within A2 is a motor MA2 having an exteriorly threaded housing, and assembly of said motor is effected in the manner illustrated in a third arm 94 which is supported by the shaft 92 of motor MA2 against a ball or roller bearing 93 and is rotatable thereby. A lineal actuator 95 is secured within 94 and has an actuator arm 95' which is operative to open and close the jaws 97a and 97b of the clamping head 96 by engagement of respective toothed surfaces of 95' with tooth formations 97c and 97d at the rear end of each clamp. Four brackets (referred to by the general notation 99) are secured to the end wall 94' of 94 and pivotally support the jaws as illustrated.

In FIG. 3 is shown a modified tool or manipulator head 80 applicable to the apparatus of FIG. 1. Secured to the flanged end 35f of arm 35' is a base 81 having flange 81' abutting 35f. A cylindrical arm or base 83 is rotationally mounted within and projects from the other end of 81 and mounts a cylindrical head 82 having a plurality of tools or manipulator mounts 84 arranged radially relative to the longitudinal axis of 83 so that rotation of 82 relative to 81 will position any of the tools or mounts 84 in alignment with a particular spatial position. Thus one of the mounts 84 may contain a first tool and the next a second tool each self-powered, and adapted to cooperate in performing different functions on the same area of a workpiece. Or each may contain the same fixture for seizing and releasing respective articles.

FIG. 4 illustrates modifications to the apparatus illustrated in FIGS. 1 and 2 including means for further stabilizing and retaining the manipulator or tool mount by the automatic projection of one or more actuators against the floor or adjacent walls, machinery or the like. While the apparatus of FIG. 4 is shown secured to and projecting downward from the vertical column 23', it may also be secured to and projectable from one or more of the arm assemblies such as 35' illustrated in FIG. 2.

The lower end of column 23' is shown having a fixture secured thereto in the form of a collar 35a which is rotatable thereon and is adapted to rotate the latter arm assembly 35" by means of a motor MR' secured within the cylindrical column 23', the shaft of which motor is secured to the end wall of collar 35a. The motor is preferably automatically controlled by signals from the positional command computer CO and is operatively connected to an output thereof. Secured to the end wall of collar 35a is a mount 52 for a lineal actuator 53 having a shaft 54 which is projectable against the floor below the production apparatus. Notation 55 refers to a shoe at the end of shaft 54 which engages the floor and forcibly retains the upper assembly in place when 54 is projected as the actuator 53 is operated. The actuator is preferably automatically controlled by the positional computer CO and may comprise a motor driven device, solenoid, or fluid cylinder. A further actuator 53' is shown secured to a bracket JS which is secured to the side wall of the fitting 35a. The actuator 53' may project against the floor or against a wall or support adjacent the work area to further stabilize the assembly and is preferably operated in a predetermined sequence with the operation of the other servos driving the various components of the apparatus 20' to project and stabilize and thereafter release the assembly for movement for prepositioning relative to another workpiece. It is noted that the actuator 53' has the primary function to stabilize the rotatable assembly whch includes 35a whereas the actuator 53 is utilized to stabilize the column 23' so that shoe 55 may be retained against the floor while the arm 54' of actuator 53' is retracted to reposition the arm 35" and/or tools or other arms secured thereto relative to different portions of a workpiece.

As stated, the arm 35" may have various tools or article seizing fixtures removably secured thereto for the performance of various operations and in accordance with such structures as provided elsewhere in this application. In FIG. 4 a motor operated tool MTD' is shown secured within the end 35a of the laterally projecting fixture and is operatively connected to a tool MTD' which may comprise any power operative device for operating on or relative to a workpiece which is prepositioned relative to the apparatus 20 or 20'. Notation 49 refers to a housing secured to 35b which may contain a fluid such as a cutting fluid, compressed gas or the like for cooperatively performing on the work provided within housing. 49 may also be other devices such as a video camera, a radiation generating apparatus for inspecting or performing operations on the work such as X-ray generating means, electron beam generating means or means for generating other forms of radiation and directing said radiation against a surface of the work. Notation 51 refers to a nozzle or probe extending from housing 49 which may be utilized to direct a fluid against the area of the work positioned 35b or to direct radiation thereagainst. The device 51 may be power operative to assume various attitudes relative to 49 and positionally controlled by signals generated by positional computer CO to which it is operatively connected. Another feature of the apparatus illustrated in FIG 4 includes a limit switch 35S secured to the arm of fixture 35b and having a long actuator arm which projects therefrom for sensing and indicating when actuated by a surface such as the surface of a workpiece which the apparatus 20' is positionably controlled to the vicinity of. Actuation of switch 35S may be utilized to provide a feedback signal to the computer CO to which it is operatively connected for indicating the prepositioning of the assembly 35" relative to said work and initiating cyclic action thereafter under the control of said computer.

FIGS. 5 and 6 illustrate details of components of a manipulator or tool joint of the type provided in FIGS. 2 and 2'. In FIG. 5 a first joint member 100 is shown which is preferably made of a unitary casting or welded assembly of a tubular portion 107 which is provided with exterior threads 108 and extends from a flange or shelf portion 106 the other face of which is secured to or integrally formed with a plate 101 the outer end of which is circular and has a semi-circular formation 102 of gear teeth therein. A hole 105 extends normal to the faces of 101 through which a pin or axle may be passed to permit the pivotal rotation of 100. Extending in a semi-circular formation around one face of 101 are a pair of conducting strips 103 and 104 which are insulatedly supported off the metal base and provide continuous electrical contact with brush elements extending from the assembly 110 when assembled with 100. The threaded plug-like formation 107 at the other end of 100 is provided with a bore 109 therethrough through which wires extending from the surface conducting elements 103 and 104 may pass to the manipulator arm into which the end 107 of 100 is threadably secured.

In FIG. 6, fitting 110 is provided with a substantially cylindrically shaped end portion 117 which is exteriorally threaded and has a bore therethrough through which wires may pass to the manipulator arm member the end of which is threadably engaged by the threads 118 of 117. Integral with and of a greater diameter than the threaded portion 117 of the fitting is a circumscribing flange or shelf 114 which supports integral, longitudinally extending bracket formations 112 and 113 which define a yoke for providing bearing support for a pin or shaft (not shown) which passes through the opening 105 in formation 101 of the fitting 100 and provides pivotal support of 100 relative to 110. In other words, both members 100 and 110 are removably securable to threaded end portions of respective tubes or pipes which may comprises respective manipulator arms and are so designed such that they may be easily assembled and disassembled with each other for replacement or in order to change the manipulator arm configuration, length, etc.

To provide electrical coupling across the joint consisting of the assembly of 100 with 110, brushes 116 and 116' are insulatedly supported against the inside face of the leaf or bracket formation 112 and are so designed that they will compressively yet slidably engage respective of the flat conducting elements 103 and 104 which are secured to one face of the gear shaped portion 101 of the member 100. The elements 116 and 116' may comprise spring strips of a spring copper alloy and are shown mounted adjacent each other on a sheet 119 of insulating material secured to the inside face of 112. Notation 115 refers to aligned holes through formations 112 and 113 through which the pivot pin supporting member 100 passes. Notation 114' refers to an opening in the shelf formation 114 through which wires 116w extending from the brush contactors 116 and 116' pass to the bore through 117. Said wires are preferably provided with a disconnectable coupling for connecting respective wires extending along the interior of the manipulator arm with the brush contactor elements, which coupling may be disconnected when it is desired to remove the fitting from the end of the manipulator arm.

In another form of the invention, the threaded tubular portions 107 and 117 of the respective fittings 100 and 110 may be eliminated whereupon the shelf formations 106 and 114 will serve as flanges which may be secured by means of fasteners to respective flanges extending outward from the ends of the manipulator arm or tubing with which the fitting is to be assembled. Assembly of the threaded fittings illustrated in FIGS. 5 and 6, is preferably accomplished by means of an adjustment nut or washer which threadably engages the threads of the tubular formations 107 and 117 and locks the assembly against the face of the end of the manipulator arm when tightened thereagainst although the fitting may be merely tightened into the threaded bore in the manipulator arm per se or held in position by means of a set screw.

FIGS. 7–11 illustrate various article seizing devices applicable to the automatic article manipulation apparatus hereinabove described. In FIGS. 7 and 8 a clamping assembly 120 is provided which comprises a base 121 having a fork-like pair of projecting portions 121a and 121b at one end thereof which provide bearing support for a pair of jaws 122 and 123 which are pivotally mounted for rotation on a shaft 124 supported by the formations 121a and 121b. The other end of the base 121 is provided with a large bevel gear G2 which is welded or integrally cast thereon and which is supported for rotation about or on a pin or shaft 23b which is supported by the fork-like formations 35a and 35b extending from the manipulator arm 35. Supported within 35 is a reversible gear-motor (not shown) having a bevel gear G1 which engages the teeth of gear G2 for rotationally driving said gear and the clamp assembly 120 about the axis of pin 23b.

Either or both of the clamping jaws 122 and 123 may be pivoted relative to the other to open a predetermined degree and clamp against a workpiece or article to be held by the assembly by the operation of respective reversible gear motors 125 and 126 which are supported against the wall of base 121. The motors 125 and 126 have respective output shafts containing small bevel gears which engage the teeth of respective gear formations 122G and 123G provided along the rear, circular edges of the respective jaw members 123 and 122 for pivotally rotating said members about the axis of a pin or shaft 124 which supports them.

If the servo motors hereinabove described as well as the motor operatively coupled for rotating gear G2 and the two motors 125 and 126 are respectively program controlled by a positional computer or multi circuit controller, the assembly 20 may be prepositioned in space relative to the prepositioned workpiece and the jaws may be controlled to open and clampingly engage a predetermined portion of the workpiece whereafter the assembly may be moved to cause the workpiece to assume a predetermined attitude or to move through a predetermined path in space in the act of effecting predetermined transfer or assembly operations relative thereto.

FIGS. 9 and 10 illustrate details of a suction holding apparatus or assembly 127 applicable to the article manipulation apparatus hereinabove described. The apparatus 127 includes a base or manipulator arm member 128 having a large bevel gear G2 integrally provided at one end thereof and having a second assembly or arm 130 removably secured to the other end thereof. The rear end of 130 is provided with a threaded formation 130' which is shown threadably engaged within a threaded bore 128' in the arm or base 128 and is secured thereto by means of a locking plate or nut 129 engaging the threads of 130' and locking the assembly, when tightened, against the front face of 128. An assembly 133, containing a suction cup 136, is pivotally secured to the end of arm 130 for positioning the suction cup 136 at any attitude relative to 130. An arm 134 extends to the suction cup and is secured to a hollow threaded tube 134 which is directly secured to the suction cup. The upper end of 134 is provided with a bevel gear G2a secured thereto having a center which is the axis of rotation of 133 about 130. Suction is applied to the interior of suction cup 136 through hollow fitting 135, the interior of arm 134 and a rotary coupling 132 which includes the hollow shaft or pin 132P on which the assembly 133 pivots. Notation 132' refers to the rotary coupling itself which is located exterior of the fork formation 130a and connects the pivotable pin 132P with a tube or pipe 131 extending parallel to the arm 130 to a similar assembly at the next joint of the manipulator. Thus, control of the various servo motors hereinabove described as well as the operation of motor 136M and the servo means controlling suction and positive pressure on line 131, may be utilized for effecting the prepositioning of the assembly of FIGS. 9 and 10 and the suction cup 136 relative to the surface of the workpiece, the engagement and retention of the workpiece thereby and the movement of said workpiece through a predetermined spatial path followed by release of the workpiece upon the automatic release of pressure from the suction cup.

In FIG. 11 is shown an article seizing assembly 137 comprising a base member 138 having a flange 139 at one end thereof which is removably securable to a manipulator arm flange as hereinabove described by means of fasteners passing through holes 139' in said flange. A clamping means is provided between the end face 138' of 138 and a jaw member 145 by inward and outward controlled and predetermined movement of said jaw member. Pivotally secured to and extending from the jaw member is a long spur gear member and guide 141 which extends through an opening in the end wall of 138 and is driven in and out of said fitting by means of a reversible gear motor 142 having a small spur gear 143 secured to its outward shaft which engages the teeth of gear 141' cut in the member 141. Further support for the jaw 145 is provided by means of a shaft or rod 149 which is secured to the upper end of a base 144 about which 145 pivots and extends through a hole bored in a projection 140 from 138. Jaw member 145 is also shown pivotally supported at the end of 141 to provide a further degree of flexibility in clamping engagement with the surface of a workpiece. A small servo motor 146 situated within 145 has an output shaft with a gear 147 engaging a bevel gear formation 148 in the end of member 141 so that 145 may pivot about 141 while the formation 145 remains fixed relative to 141.

It is briefly noted that the connecting ends of the assemblies illustrated in FIGS. 7–10 may each be provided with a flange formation such as flange 139 of FIG. 11 for directly securing the assembly to a flange at the end of a manipulator arm such as illustrated in the other drawings hereinabove described. Conversely the assembly illustrated in FIG. 11 may be provided with a bevel or spur gear secured to the end in place of the flange 139 for pivotally assembling said assembly 137 relative to a manipulator assembly of the types provided elsewhere herein. Various other manipulator or automatic tool assemblies may be provided for removable assembly with the apparatus of this application as shown and described in my application Ser. No. 477,467.

It has been noted that the apparatus hereinabove described may be automatically controlled to seize, preposition and release an article of manufacture in a manufacturing operation or to perform other operations relative to work-in-process by prepositioning a tool or inspection device, by applying an automatic controller referred to by the notation CO which is operative to control the various servo motors described. While the automatic controller may comprise a simple multi-circuit recycle timer operatively connected to energize and de-energize the various servo motors illustrated in FIGS. 1 and 2, a more precise and easily adjustable or changeable programming means may be derived by reproducing command recordings from a recording member such as a card or tape.

A complete description of the control apparatus for controlling the various manipulator components to move along predetermined paths or to swing predetermined arcs during predetermined intervals in an operational cycle is brief since it is not claimed specifically herein. However, one form of such automatic control is illustrated schematically in FIG. 12. This system utilizes stored digital command recordings which are converted to analog for sequentially coordinated servo controlled movement of the various drive motors previously described. The specific control circuitry may be of various forms well known to those skilled in the art, with, however, reference being made to Mergler, A Digital-Analog Machine Tool Control System, National Advisory Committee for Aeronautics, Lewis Flight Propulsion Laboratory, Cleveland, Ohio, Proceedings of the Western Joint Computer Conference, February 9, 1954, for the details of one such servo-controlled system. It should be recognized that such a system is merely representative of my invention's application and is not intended as a limitation thereof.

In FIG. 12 the automatic controller CO derives command signals by reproducing digital command recordings from a magnetic or punched tape 401 which is driven in a predetermined path, preferably a closed loop, about a tape transport referred to by the general notation 400 which transport includes a drive wheel or sprocket 402 which is rotated at constant speed by means of a tape drive motor MT having forward drive controls F and S. A bank of reproduction heads 403 is operatively coupled to reproduce the pulse codes recorded on the tape 401, each of which heads is operatively connected to the input of a respective converter controller 405 which controls the operation of a respective servo motor. Reproduction transducer 403–1, for example, is operatively connected through a reproduction amplifier 404 to a control circuit 405–Mx which is operative in response to the train of pulses reproduced by 403–1 to control the motor Mx to operate in a predetermined manner to effect positioning of the entire manipulator 20 along the overhead trackway 22 relative to a particular work area spatial volume. Similarly reproduction head 403–2 is connected through its reproduction amplifier to the input of a control circuit 405–My and the signals reproduced thereby are operative to control the motor My in a predetermined manner. The other servo motors illustrated which are operatively controlled by signals reproduced by respective reproduction heads of the bank 403 include a motor MR such as illustrated in FIGS. 1 or 2, a second servo motor MA1 which is operative to effect pivotal rotation of an assembly such as the arm assembly illustrated in FIG. 2′ relative to the remainder of the manipulator assembly and servo motor MJ is operative to operate an article seizing device such as any of those illustrated in FIGS. 7–11 in response to signals reproduced by reproduction head 403–5.

The controller 405–J is illustrated in further detail in FIG. 12 and will be described. It is assumed that the other controllers having the servo notations Mx, My, MR and MA, preceded by the numerical notation 405– are similar in construction to 405–J. The binary code pulse output of the reproduction head 403–5 is first passed to a series-to-parallel diode converter 406 where each code command is converted to a parallel code which code is transmitted to a relay storage bank 407 containing precision resistors. The contacts of the storage unit relays set up the resistance bank in 407 so that the resistance is proportional to the digital information recorded on the tape 401. Thus the relay storage introduces a resistance proportional to the numerical value of the signals reproduced from the tape into a self-balancing bridge which forms part of a comparator device 408. A feed back signal is generated during the operation of the servo motor MJ being controlled by means of a response potentiometer 409 which is coupled to the shaft of the control motor and provides an error signal at the output of the comparator 408 which is used to control the operation of said motor until the bridge is balanced or a null condition exists whereupon the motor will stop with the jaws or article seizing device controlled thereby being at a predetermined open or closed condition. The position of the command signals recorded on the tape 401 will determine just when the jaws will open or close in a cycle of operation and will similarly provide effective control for the other servos of the manipulator to control movement of the various components or assemblies, by providing binary code command signals at the inputs to each of the control circuits 405 of each of the motors.

It is noted that the tape drive motor MT may be operated continuously to provide automatic recycle operation of the manipulator if the articles to be seized and transferred or operated on thereby are continuously fed to a predetermined spatial location as determined by, for example, the end of a chute or conveyer or by movement along a conveyor adjacent the manipulator assembly. Recycling may also be effected by providing means for sensing the appearance of an article at a predetermined spatial location as, for example, it is fed to the end of a chute or travels along a conveyor whereby the sensing means provides a pulse signal for energizing the start control F of motor MT which motor has been previously stopped by energization of the stop control S thereof. The stop control S of MT may be energized, for example, by reproduction of a signal from a further channel of the tape 401 at the end of the cycle.

The arrangement of servo motors illustrated in FIG. 12 is only illustrative and variations in the number and type of said servos will be provided in accordance with variations in both the physical arrangement of manipulator components and servos operative to drive said components. For example, the motor Mx may be eliminated from the control cycle if the manipulator apparatus is manually prepositioned relative to a predetermined spatial location. Similarly, any of the other servo motors may be eliminated or may be multiplied in number depending on the particular physical arrangement of manipulator arms, rotatable assemblies and columns. Notation 410 in FIG. 12 refers to a sensing relay, preferably mounted on the manipulator in a position to sense the presence of an article or assembly immediately adjacent said manipulator. In FIG. 2, the sensing relay 410 is illustrated as a photoelectric cell mounted on the arm 75 immediately adjacent the jaw assembly 70. The output 411 of the sensing relay 410 is operatively connected to the start control F of motor MT to transmit a pulse thereto to effect recycling of the tape 401 when said sensing relay becomes energized upon sensing the surface of an article or assembly in alignment with the manipulator. The relay 410 may comprise any type of suitable sensor capable of generating an output signal when an article is in the immediate vicinity of said device and may comprise a photoelectric cell with or without a light source immediately adjacent thereto for beaming light against the surface to be sensed which is reflected thereby back to the cell, and infra-red detector for detecting the surface of the article to be seized or operated on, a limit switch operative to generate an output signal upon contact with the surface of the article or assembly, an electro magnetic or other type of proximity switch etc. Notation 403-S refers to a pick up head operatively connected to a sixth channel of the tape 401 for reproducing a stop-signal recorded at the end of the cycle recordings which is transmitted to energize the stop control S of motor MT which stops until the start control F is energized upon activation or energization of the sensing relay 410. Power supplies are not illustrated in FIG. 12 for the purpose of simplifying the diagram and it is assumed that they are provided on the correct sides of all relays, amplifiers and other circuits.

FIGS. 13 and 14 illustrate details of an automatic manipulator which, unlike the manipulators illustrated in FIGS. 1-4, is mounted on a carriage or vehicle which is movable along the floor of a work area, preferably on tracks R1 and R2 secured to the floor. The manipulation apparatus 300 comprises a rigid vehicle body 301 having at least four wheels 302 rotationally supported and depending downwardly from said body for movement along the rails R1 and R2. Centrally disposed and projecting upwardly from said body is an assembly 303 comprising a plurality of manipulator elements including a first vertical cylindrical column 304 rotationally supported within the vehicle body 301 and rotatable by means of a large spur gear 305 secured to the end thereof which is driven by a second smaller circular gear 306 secured to the shaft of a reversible gear-motor 307 which is shown retained against the side wall of the vehicle body. Slidably movable within column 304 is a second vertical column 308 secured at its lower end to the shaft of a lineal actuator 303 which is preferably driven by an electric motor. The column or arm 308 defines one end of an assembly of manipulator arms which is movable vertically within 304 but restrained against rotation therein by means of a pin or key 309 projecting outwardly therefrom which rides in a vertical slot 304' in the vertical column 304. Thus as motor 307 rotates column 304, the upper assembly defined by 308 rotates therewith but is vertically movable within 304 by the vertical movement of the shaft of lineal actuator 303.

Notations 310, 312 and 314 refer to pivoting joints of the type hereinabove described which respectively connect arms 308, 311, 313 and 315. The end of arm 315 is provided with a rotary joint 316 similar to that defined near the end of the manipulator of FIG. 2 and an article seizing head or jaw assembly 317 is secured to the endmost arm 318 situated beyond the rotary joint 316.

It is thus seen that the article manipulator head 317 may be rotated and pivoted by the automatic controlled operation of the various servos such as 307 and those operating device 303, joints 310, 312, 314 and 316. A sequential controller or positional computer CO is shown secured within the body of the vehicle 301 which body may also contain a power supply for operating the various servos and the controller CO. Notations 319 and 319' refer to lineal actuators which are mounted at the sides of the vehicle body 301 and may be automatically operated to project arms against the floor to stabilize the body of the vehicle in a predetermined position. A motor for driving and prepositioning the vehicle at different locations in a work area is mounted within the body 301 although not illustrated and may also be automatically controlled by the positional controller CO to define the location of the apparatus 300 relative to articles or work to be handled thereby.

Variations in the particular arm arrangement protruding upwardly and outwardly from the vehicle body 301 are possible and it is to be understood that the arrangement provided in FIGS. 13 and 14 is merely illustrative. The various fittings and article seizing means illustrated in FIGS. 7-11 may be removably secured to the fixture or arm at the end of the manipulator assembly of FIGS. 13 and 14.

FIG. 15 shows another arrangement in an automatic vehicle mounted manipulation or tool apparatus referred to by the general notation 320. The apparatus includes a vehicle body 321 mounting preferably a power supply, positional controller CO, fluid pressurizing means 344 for propulsion or effecting the operation of various production tools, etc. Projecting upwardly from the body 321 is a frame 322 including longitudinal tubular members 322' and 323 held together by end members 324 and 325 and supported by verticals 326 and 327 as well as other frame members 328, 329, etc. A carriage 330 is movable along the longitudinal members 322' and 323 and is power operated by means of a motor Mx. A second carriage 331 is movable longitudinally along the carriage 330 and is power operated by its own motor (not shown) for driving a manipulator assembly 20'' therealong. The assembly 20'' is preferably similar in most respects to the manipulator assembly 20' of FIG. 2 and may contain either an article seizing head or a tool at the end thereof. In FIG. 15 a tool or inspection device 342 is provided at the end of the end-most arm 340 which is pivotally mounted on a joint 339 which extends from a further arm 338 which is rotationally mounted on rotary joint 337 relative to a further arm 336 which is rotationally mounted on the arm 334 corresponding to 23' of FIG. 2. Notation 341 refers to a surface sensing device such as a limit switch, electro magnetic or photoelectric relay mounted adjacent the tool or clamping head 342 for sensing the surface of an article or assembly immediately adjacent the apparatus 320. The operation of 341 is similar to the device 410 of FIGS. 2 and 12 which is operative to initiate an automatic cycle of operation. Thereafter the control computer or cycle controller is operative to start, stop and otherwise control the various servos in accordance with the preset program thereof.

In order for the apparatus illustrated in FIGS. 13-15 to perform automatic article or tool manipulation functions, the articles, equipment or machines to be operated on thereby must be prepositioned relative to the track or guideway for the vehicles mounting said manipulation apparatus or means must be provided for sensing or otherwise identifying the surface of an article or assembly adjacent the trackway. Accordingly, articles or equipment may be prepositioned adjacent the floor mounted trackway or rails R1 and R2 and the vehicle may be automatically controlled to stop at a predetermined location along its track which location is either determined by sensing the surface of an article or machine by means of a sensor such as 410 of FIG. 2 or 341 of FIG. 15 located on the manipulator or vehicle body or by means of sensing the distance travelled along the trackway or rails. In the latter case, the motor effecting movement of the vehicle along the track may be controlled to stop the vehicle at a predetermined distance therealong by the means illustrated in FIG. 2 or by counting rotations of said motor and generating feedback signals to a predetermining controller such as a presettable predetermining counter. In a simpler form of the invention, the vehicle may be prepositioned relative to a machine, assembly, articles or the like by an operator and thereafter automatically controlled by means of the controller CO to perform predetermined manipulation functions.

FIG. 16 illustrates a floor mounted apparatus 170 employing an arm assembly 136′ of the type described for performing various transfer or production operations relative to work-in-process. The apparatus includes a first stationary vertical column 171 preferably secured to or fixedly maintained against the floor and having an assembly 172 secured to the upper end of 171 and including an overhead track 174 extending horizontally outward from 171. The overhead track 174 forming part of the overhead assembly is secured to a mount 176 which is shown rotationally mounted at the upper end of 171 and rotatable by means of a circular gear 177 secured thereto which is engaged by a smaller circular spur or bevel gear 173 which is part of the gear frame associated with a gear-motor 173 secured to 171.

A manipulator assembly 175 is supported on an overhead carriage 179 which is movable along track 174 and power operated by means of an electric motor 175M secured to the carriage. Depending downward from 179 and rotationally supported thereon is a first column member 184 having a gear motor 182 secured thereto, the drive gear 183 of which engages a large circular spur or bevel gear 181 secured to 179 so that a reversible motor 182 operates, it will cause rotation of 184. Supported by and extending vertically downward from 184 is a cylindrical track 185 which supports a fixture 186 containing the manipulator arm assembly. Fixture 186 and the arm assembly are movable vertically up and down column or track 185 by means of a reversible drive motor 187 secured to 186. A lineal actuator 188 is secured to the lower end of 185 and is operative to project a ram or plate against the floor to support the assembly 175 from the load.

The manipulator arm assembly 136′ includes a flexible arm unit 190 secured to a base 191 which is removably secured to fixture base 186. Retained against the other end of 190 is a jaw assembly 137′ of the type illustrated in FIG. 3 but having a modified base 145′ containing a single servo such as a lineal actuator for opening and closing the individual jaws 138′ and 139′ in response to an input signal or signals to the control or said actuator. Details of such a lineal actuator operated jaw assembly are shown in my said application Serial No. 477,467. A presettable programming device or positional computor CO is provided in a housing 171′ shown secured to the vertical column 171 and preferably contains a plurality of output circuits connneced to each of the described servos for sequentially controlling their operation to preposition the assemby 172 at a predetermined angular attitude relative to 171, the carriage 179 at a predetermined location along overhead track 174, the assembly 175 in a predetermined attitude relative to 179, the fixture base 186 at a predetermined location along the vertical column 185 and the flexible deflectable arm 190 in a predetermined deflected attitude and to move thereafter through a predetermined arc to predetermine the path of movement of the jaw assembly 137′ and the movement of an article retained thereby. Electrical coupling is attained between the outputs of CO and the assembly 172 by means of conventional brush contacting means having components secured to the upper end of 171 and to 176 in sliding engagement with each other, by means of a plurality of slide wires 178 insulatedly supported above 174 which are engaged by a plurality of respective brushes shown at 180 which are insulatedly supported on and project upward from the carriage 179 and by further brush-slide contact means electrically coupling 184 to 179, 186 to 185 and assembly 36′ to 191. The laterally extending arm 190 which pivots about base 191, is provided with a flange 135 at the end thereof and the assembly 136 may be fixedly mounted on or rotationally mounted relative to arm 190 and power operated by the reversible motor secured within 145′ but not shown. Details of such a structure will be hereinafter described. The jaws 138′ and 139′ are automatically opened and closed to seize and preposition a workpiece there-between by means of one or more lineal actuators secured within the base 145′ which directly supports said jaw members. It is noted that each of the hereinabove described servos including the locking servos 25 and 29 of FIGS. 1 and 2 are preferably automatically controlled by the positional control or computing mechanism situated within the housing CO by wires or other conductors extending to each of the movable components with coupling preferably being made by means of brushes sliding across stationary contacts or slip rings at each of the joints as will hereinafter be more fully described.

It is to be understood that the above-described arrangements are illustrative of the application of the principles of the invention. Numerous other arrangements may be devised by those skilled in the art without departing from the spirit and scope of the invention.

I claim:
1. An article manipulator for handling work-in-process comprising in combination:
  (a) a manipulator arm assembly including mechanical means disposed at one end thereof for seizing and retaining an article,
  (b) a base member operatively connected to said manipulator arm assembly for supporting said assembly,
  (c) manipulation means between said base member and said arm assembly for moving and guiding said arm assembly,
  (d) first servo means for driving said manipulator arm assembly in predetermined path relative said base member,
  (e) said seizing means comprising means for engaging and retaining an article on said manipulator arm assembly and including at least one member movable for grasping and releasing said article,
  (f) second servo means connected for operating said article seizing means,
  (g) controls for said servos,
  (h) a variable programming means operatively connected to said servo controls including means for generating a plurality of control signals of predetermined characteristics and in a predetermined sequence,
  (i) said programming means being operative to control said servos and to predetermine the movement of said manipulator arm assembly and said article seizing means along a predetermined path to automatically effect manipulation of an article retained by said manipulator, the movement of said article through a predetermined spatial path and the release of said article at a predetermined position along the path of movement of said arm assembly,
  (j) sensing means mounted on said manipulator and movable therewith for sensing the presence of an article prepositioned relative to said manipulator, said sensing means including means for generating a signal upon sensing an article adjacent said manipulator, and initiating predeterminedly responsive operation of said programming means.

2. An article manipulator in accordance with claim 1, wherein:
  said seizing means comprising jaw means for clampingly engaging and retaining an article on said manipulator arm assembly and including a movable jaw having a pair of clamp members, at least one of said clamp members being movable for compressively engaging an article against the other clamp member.

3. An article manipulator for handling work-in-process comprising in combination:
  (a) a manipulator arm assembly including mechanical means disposed at one end thereof for seizing and retaining an article,
  (b) a base member operatively connected to said manipulator arm assembly for supporting said assembly,
  (c) manipulation means between said base member and said arm assembly for moving and guiding said arm assembly,
(d) first servo means for driving said manipulator arm assembly in a predetermined path relative said base member,
(e) said seizing means comprising means for engaging and retaining an article on said manipulator arm assembly and including at least one member movable for grasping and releasing said article,
(f) second servo means connected for operating said article seizing means,
(g) controls for said servos,
(h) a variable programming means operatively connected to said servo controls including means for generating a plurality of control signals of predetermined characteristics and in a predetermined sequence,
(i) said programming means being operative to control said servos and to predetermine the movement of said manipulator arm assembly and said article seizing means along a predetermined path to automatically effect manipulation of an article retained by said manipulator, the movement of said article through a predetermined spatial path and the release of said article at a predetermined position along the path of movement of said arm assembly,
(j) including means for prepositioning an article relative to said manipulator and means mounted on said manipulator and movable therewith for sensing the presence of said article, said sensing means including means for generating a signal upon sensing an article adjacent said manipulator, said programming means being of the recycle type and having control means for initiating an operational cycle, said control means being operatively connected to said sensing means for effecting the initiation of a control cycle when said sensing means senses the presence of an article aligned with said automatic manipulator.

4. An article manipulator for handling work-in-process comprising in combination:
(a) a manipulator arm assembly including suction means for engaging and retaining an article against said assembly for transferring said article with the movement of said assembly,
(b) a base member operatively connected to said arm assembly for supporting said assembly,
(c) manipulation means between said base member and said arm assembly for moving and guiding said assembly,
(d) first servo means for driving said manipulator arm assembly a predetermined path relative said base member,
(e) said suction means comprising at least one suction cup,
(f) means for applying suction to the volume defined by said suction cup,
(g) second servo means operative to apply and release suction by operating said suction applying means,
(h) controls for said servos,
(i) a variable programming means operatively connected to said servo controls and including means for generating a plurality of control signals of predetermined characteristics and in a predetermined sequence,
(j) said programming means being operative to control said servos and to predetermine the movement of said manipulator arm assembly and the sequence and duration of application of suction to said suction means to automatically effect the seizing of an article, the movement of said article through a predetermined spatial path and the release of said article at its predetermined position along the path of the movement of said arm assembly,
(k) sensing means mounted on said manipulator and movable therewith for sensing the presence of an article prepositioned relative to said manipulator, said sensing means including means for generating a signal upon sensing an article adjacent said manipulator, and initiating predeterminedly responsive operation of said programming means.

5. An article manipulator for handling work-in-process comprising in combination:
(a) a manipulator arm assembly including mechanical means disposed at one end thereof for seizing and retaining an article,
(b) a base member operatively connected to said manipulator arm assembly for supporting said assembly,
(c) manipulation means between said base member and said arm assembly for moving and guiding said arm assembly,
(d) first servo means for driving said manipulator arm assembly in a predetermined path relative said base member,
(e) said seizing means comprising means for engaging and retaining an article on said manipulator arm assembly and including at least one member movable for grasping and releasing said article,
(f) second servo means connected for operating said article seizing means,
(g) controls for said servos,
(h) a variable programming means operatively connected to said servo controls including means for generating a plurality of control signals of predetermined characteristics and in a predetermined sequence,
(i) said programming means being operative to control said servos and to predetermine the movement of said manipulator arm assembly and said article seizing means along a predetermined path to automatically effect manipulation of an article retained by said manipulator, the movement of said article through a predetermined spatial path and the release of said article at a predetermined position along the path of movement of said arm assembly,
(j) including a normally inoperative starting control for activating said programming means to control movement of said article seizing means in said predetermined sequence of motions, a storage location including means for prepositioning a workpiece, sensing means mounted on said article manipulator, and operatively connected to activate said starting control when energized, position indicating means associated with said storage location, said sensing means being operative upon alignment with said indicating means to activate said starting control of said program control means to initiate said predetermined sequence of motions of said article seizing means.

6. An article manipulator for handling work-in-process comprising in combination:
(a) a manipulator arm assembly including mechanical means disposed at one end thereof for seizing and retaining an article,
(b) a base member operatively connected to said manipulator arm assembly for supporting said assembly,
(c) manipulation means between said base member and said arm assembly for moving and guiding said arm assembly,
(d) first servo means for driving said manipulator arm assembly in a predetermined path relative said base member,
(e) said seizing means comprising means for engaging and retaining an article on said manipulator arm assembly and including at least one member movable for grasping and releasing said article,
(f) second servo means connected for operating said article seizing means,
(g) controls for said servos, (h) a variable programming means operatively connected to said servo controls including means for generating a plurality of control signals of predetermined characteristics and in a predetermined sequence, (i) said programming means being operative to control said servos and to predetermine the movement of said manipulator arm assembly and said article seizing means along a predetermined path to automatically effect manipulation of an article retained by said manipulator, the movement of said article through a predtermined spatial path and the release of said article at a predetermined position along the path of movement of said arm assembly, (j) said programming means being of the self resetting recycle type operative to become deactivated at the end of a control cycle, means mounted on said manipulator for sensing a surface of a normally inoperative starting control for activating said programming means to control movement of said article seizing means in said predetermined sequence of motions, said sensing means being operatively connected to activate said starting control when energized upon sensing the surface of an article to be seized and transferred whereby said programming means is operative to effect a cycle of automatic operation of said article seizing means.

7. An article manipulator for handling work-in-process comprising in combination:

(a) a manipulator arm assembly including mechanical means disposed at one end thereof for seizing and retaining an article, (b) a base member operatively connected to said manipulator arm assembly for supporting said asembly, (c) manipulation means between said base member and said arm assembly for moving and guiding said arm assembly, (d) first servo means for driving said manipulator arm assembly in a predetermined path relative said base member, (e) said seizing means comprising means for engaging and retaining an article on said manipulator arm assembly and including at least one member movable for grasping and releasing said article, (f) second servo means connected for operating said article seizing means, (g) controls for said servos, (h) a variable programming means operatively connected to said servo controls including means for generating a plurality of control signals of predetermined characteristics and in a predetermined sequence, (i) said programming means being operative to control said servos and to predetermine the movement of said manipulator arm assembly and said article seizing means along a predetermined path to automatically effect manipulation of an article retained by said manipulator, the movement of said article through a predetermined spatial path and the release of said article at a predetermined position along the path of movement of said arm assembly.

(j) means for prepositioning an article relative said article seizing means, means mounted on said manipulator for sensing a surface of said positioning means, a normally inoperative starting control for activating said programming means to control movement of said article seizing means in said predetermined sequence of motions, said sensing means being operatively connected to activate said starting control when energized upon sensing the surface of said prepositioning means whereby said programming means is operative to effect a cycle of automatic operation of said article seizing means.

8. An article manipulator for handling work-in-process comprising in combination:

(a) a manipulator arm assembly including mechanical means disposed at one end thereof for seizing and retaining an article, (b) a base member operatively connected to said manipulator arm assembly for supporting said assembly, (c) manipulation means between said base member and said arm assembly for moving and guiding said arm assembly, (d) first servo means for driving said manipulator arm assembly in a predetermined path relative said base member, (e) said seizing means comprising means for engaging and retaining an article on said manipulator arm assembly and including at least one member movable for grasping and releasing said article, (f) second servo means connected for operating said article seizing means, (g) controls for said servos, (h) a variable programming means operatively connected to said servo controls including means for generating a plurality of control signals of predetermined characteristics and in a predetermined sequence, (i) said programming means being operative to control said servos and to predetermine the movement of said manipulator arm assembly and said article seizing means along a predetermined path to automatically effect manipulation of an article retained by said manipulator, the movement of said article through a predetermined spatial path and the release of said article at a predetermined position along the path of movement of said arm assembly, (j) means mounted on said manipulator for sensing a surface of a normally inoperative starting control for activating said programming means to control movement of said article seizing means in said predetermined sequence of motions, said sensing means being operatively connected to activate said starting control when energized upon sensing the surface of an article to be seized and transferred whereby said programming means is operative to effect a cycle of automatic operation of said article seizing means.

9. An article manipulator for handling work-in-process comprising in combination:

(a) a manipulator arm assembly including mechanical means disposed at one end thereof for seizing and retaining an article, (b) a base member operatively connected to said manipulator arm assembly for supporting said assembly, (c) manipulation means between said base member and said arm assembly for moving and guiding said arm assembly, (d) first servo means for driving said manipulator arm assembly in a predetermined path relative said base member.

(e) said seizing means comprising means for engaging and retaining an article on said manipulator arm assembly and including at least one member movable for grasping and releasing said article, (f) second servo means connected for operating said article seizing means, (g) controls for said servos, (h) a variable programming means operatively connected to said servo controls including means for generating a plurality of control signals of predetermined charactersitics and in a predetermined sequence, (i) said programming means being operative to control said servos and to predetermine the movement of said manipulator arm assembly and said article seizing means along a predetermined path to automatically effect manipulation of an article retained by said manipulator, the movement of said article through a predetermined spatial path and the release of said article at a predetermined position along the path of movement of said arm assembly, (j) start-cycle control means for said programming means, light reflecting means disposed adjacent said manipulator apparatus, a light source and photoelectric sensing means mounted on said manipulator arm assembly adjacent said article seizing means head and operatively connected to said start cycle control means, said photoelectric means being energizable upon sensing said reflecting means to energize said start-cycle control means to start a cycle of automatic transfer operations.

References Cited by the Examiner

UNITED STATES PATENTS

| | | | |
|---|---|---|---|
| 1,140,839 | 5/1915 | Moore. | |
| 1,837,718 | 12/1931 | Kendall et al. | 212—127 |
| 2,428,856 | 10/1947 | Sinclair | 214—16.1 |
| 2,475,245 | 7/1949 | Leaver et al. | 318—162 |
| 2,537,770 | 1/1951 | Livingston et al. | 318—162 |
| 2,580,472 | 1/1952 | Smith | 214—147 |
| 2,623,626 | 12/1952 | Ditolla | 198—21 |
| 2,679,940 | 6/1954 | Goertz et al. | |
| 2,691,448 | 10/1954 | Lontz. | |
| 2,696,921 | 12/1954 | Desjardins | 214—16.1 |
| 2,697,529 | 12/1954 | Hubbell et al. | 214—147 |
| 2,822,094 | 2/1958 | Greer | 212—127 |
| 2,861,700 | 11/1958 | James. | |
| 2,988,237 | 6/1961 | Devol | 214—11 |

OTHER REFERENCES

Mergler: A Digital-Analog Machine Tool Control System, National Advisory Committee for Aeronautics, Lewis Flight Propulsion Laboratory, Cleveland, Ohio, Proceedings of the Western Joint Computer Conference, Feb. 9, 1954.

GERALD M. FORLENZA, *Primary Examiner.*

HUGO O. SCHULZ, *Examiner.*

R. G. SHERIDAN, *Assistant Examiner.*